Aug. 14, 1951     W. E. BELCHER, JR     2,564,294
SUPERVISORY MEASURING INSTRUMENT
Filed July 30, 1949     10 Sheets-Sheet 1
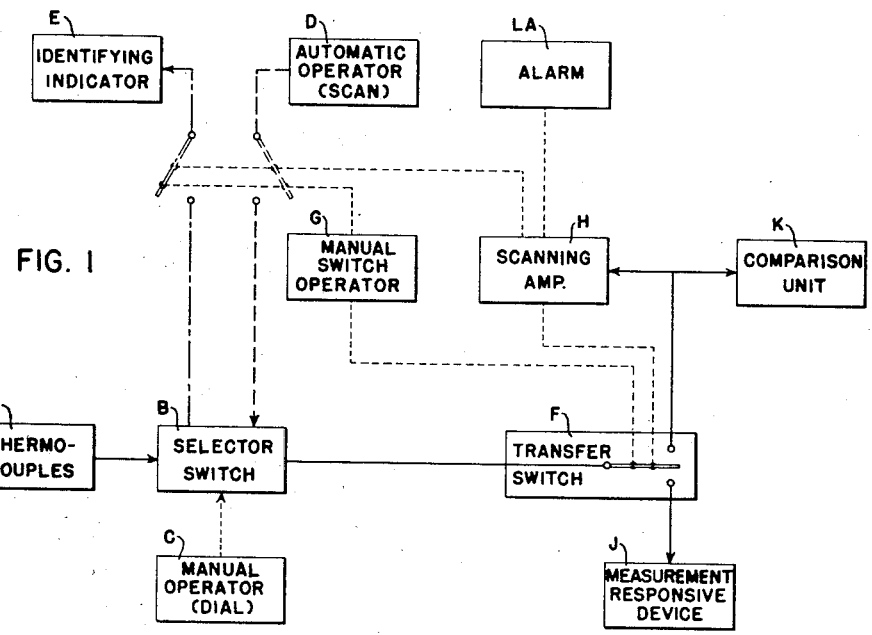
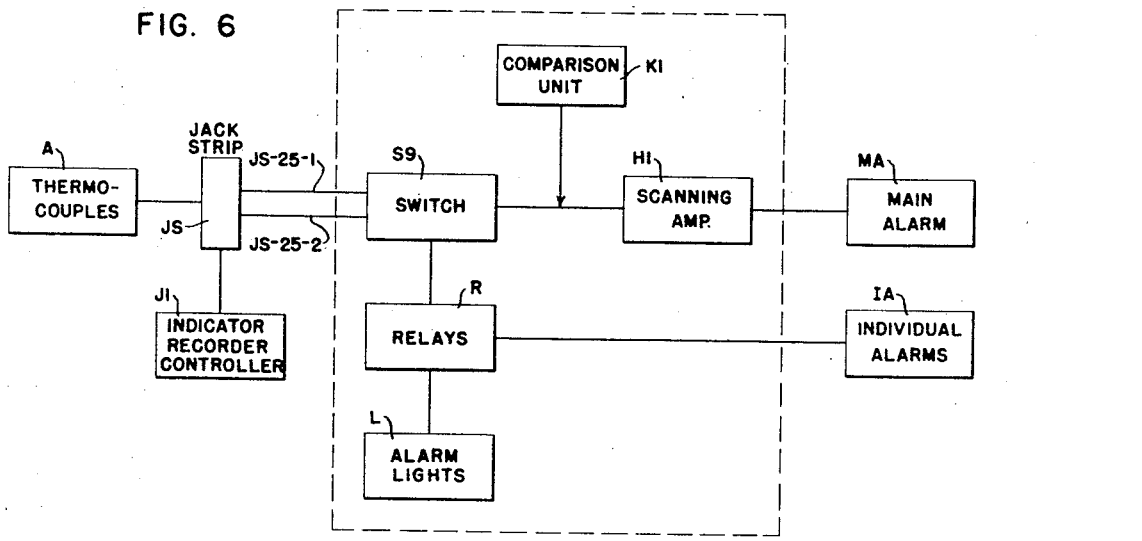
*INVENTOR.*
WALLACE E. BELCHER JR.
BY
ATTORNEY.

INVENTOR.
WALLACE E. BELCHER JR.
BY
ATTORNEY.

Aug. 14, 1951  W. E. BELCHER, JR  2,564,294
SUPERVISORY MEASURING INSTRUMENT
Filed July 30, 1949  10 Sheets-Sheet 4

INVENTOR.
WALLACE E. BELCHER JR.
BY
ATTORNEY.

INVENTOR.
WALLACE E. BELCHER JR.
BY
ATTORNEY.

*INVENTOR.*
WALLACE E. BELCHER JR
BY
ATTORNEY.

Aug. 14, 1951 W. E. BELCHER, JR 2,564,294
SUPERVISORY MEASURING INSTRUMENT
Filed July 30, 1949 10 Sheets-Sheet 7
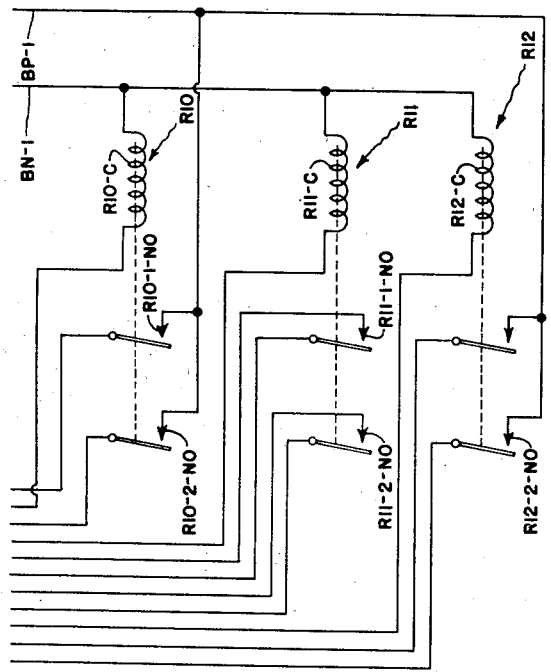
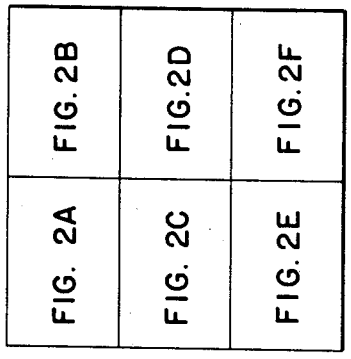
FIG. 2
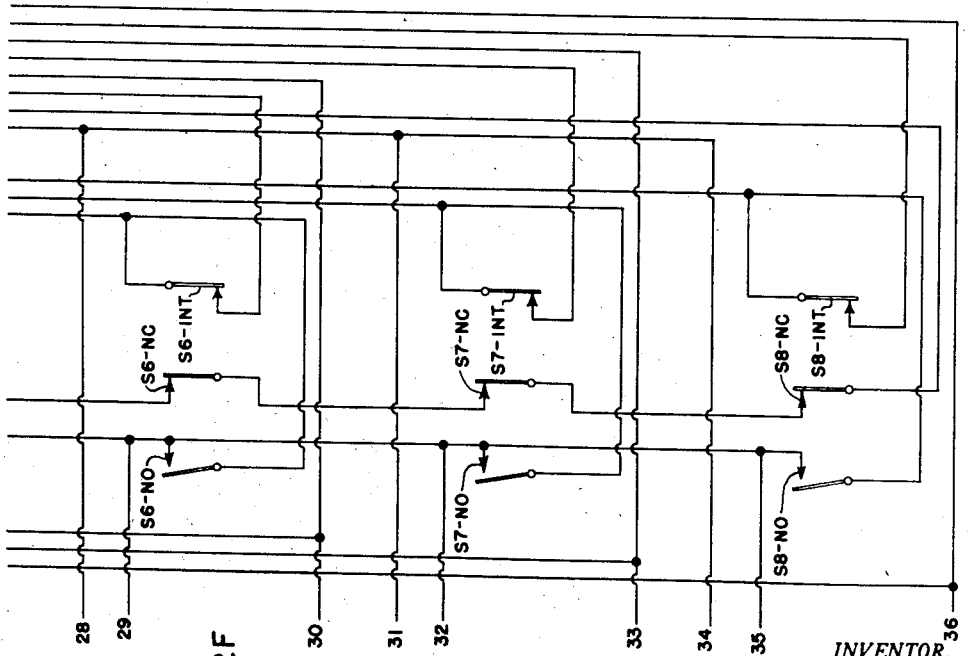
FIG. 2F
INVENTOR.
WALLACE E. BELCHER JR.
BY
ATTORNEY.

Aug. 14, 1951 W. E. BELCHER, JR 2,564,294
SUPERVISORY MEASURING INSTRUMENT
Filed July 30, 1949 10 Sheets-Sheet 8

INVENTOR.
WALLACE E. BELCHER JR.
BY
ATTORNEY.

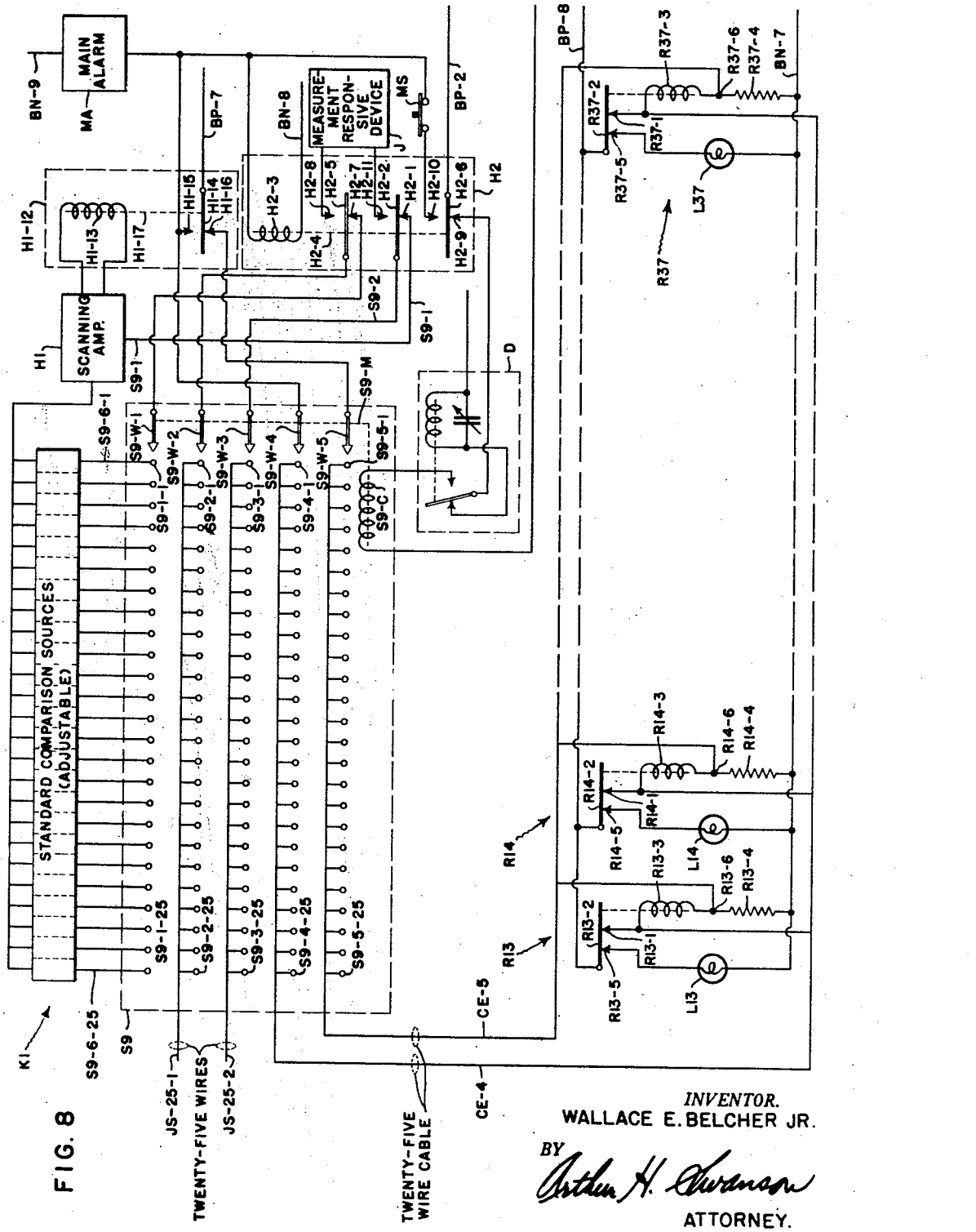

Patented Aug. 14, 1951

2,564,294

UNITED STATES PATENT OFFICE 2,564,294

SUPERVISORY MEASURING INSTRUMENT

Wallace E. Belcher, Jr., Philadelphia, Pa., assignor to Minneapolis-Honeywell Regulator Company, Minneapolis, Minn., a corporation of Delaware Application July 30, 1949, Serial No. 107,682

11 Claims. (Cl. 177—311)

This invention relates to means for selectively or cyclically monitoring a plurality of measuring instruments.

Modern research and production require that a large number of variables be controlled. For example, in testing an airplane or in the operation of a petroleum refining plant, a large number of variables must be simultaneously measured. These measurements can be indicated, recorded or used to operate a controller to vary an operation or process in accordance with the requirements disclosed by the measurements.

This invention relates more particularly to an electrically operated mechanism for connecting a selected one of a plurality of measuring instruments, such as thermocouples, to a measurement-responsive device, which may be an indicator, recorder or controller, for example, a potentiometer. The measuring instrument may be selected manually or all the measuring instruments may be connected individually one after the other in a time cycle. When the selected one of the measuring instruments senses a measurement at, above, or below a desired, preselected value, one or more of the following actions can take place:

1. The selection or scanning of the measuring instruments is stopped or continued at such a reduced speed as to permit the indicating, recording, or controlling device, which is connected to the selected measuring instrument, to complete its action while the device is connected to that one measuring instrument and before it is disconnected from that measuring instrument and connected to the next.

2. The selected measuring instrument is connected to a measuring and/or recording and/or controlling device.

3. The selected measuring instrument is connected to an identifying indicator i. e. means for telling which measuring instrument has been selected and is now connected.

4. An alarm is operated.

This invention provides the following functions:

1. Rapid comparison of each of a number of thermocouples with an arbitrary, standardized, adjustable voltage source for each thermocouple at a rate of up to ten thermocouples per second without interruption in the event of excessive temperature.

2. The initiation of individual or total control or alarm action by means of relay contacts in the event that the temperature of one or more thermocouples exceeds or falls below an adjustable arbitrary value, which value can be independently adjustable for each thermocouple.

3. a. Either indication of the temperature of any thermocouple as desired by the operator without interruption of the scanning cycle, or b. Recording of up to sixteen of the temperatures at a maximum rate of one temperature per second continuously or at will without interruption of the scanning cycle.

It is an object of this invention to provide such an indicating, recording or control device and particularly one which can be built up of a minimum number of readily available, standard parts and which is positive, simple and efficient in operation.

It is a further object of this invention to provide such a device in which the speed of operation, particularly the speed of automatic operation, is enormously increased over the speed of such devices heretofore known. This increased speed is gained by only comparing the measuring instrument, or more specifically the voltage produced by the measuring instrument, with a standard of comparison, such as an adjustable potentiometer. As a result of this comparison, if there is a difference between the measurement sensed by the measuring instrument and the selected measurement to which the standard has been preset, a quick-operating device, such as a relay, is actuated without waiting for the measurement of the measuring instrument and the preset measurement of the standard to be equalized.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a block diagram showing the essential elements of the invention.

Figure 2A:
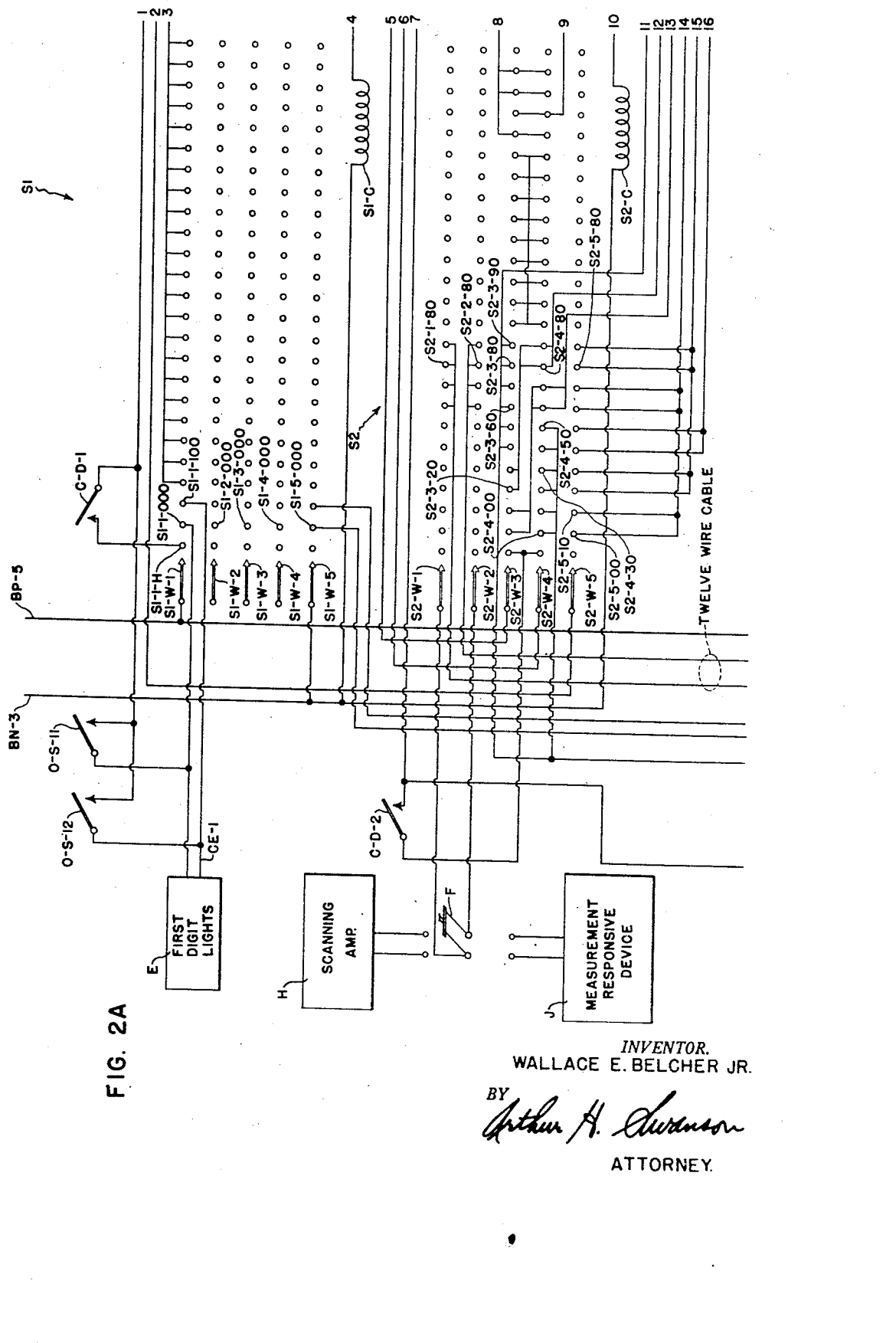
Fig. 2 (Sheet 7) is a diagram showing the way in which the sheets forming parts of this figure are combined.
Figure 2B:
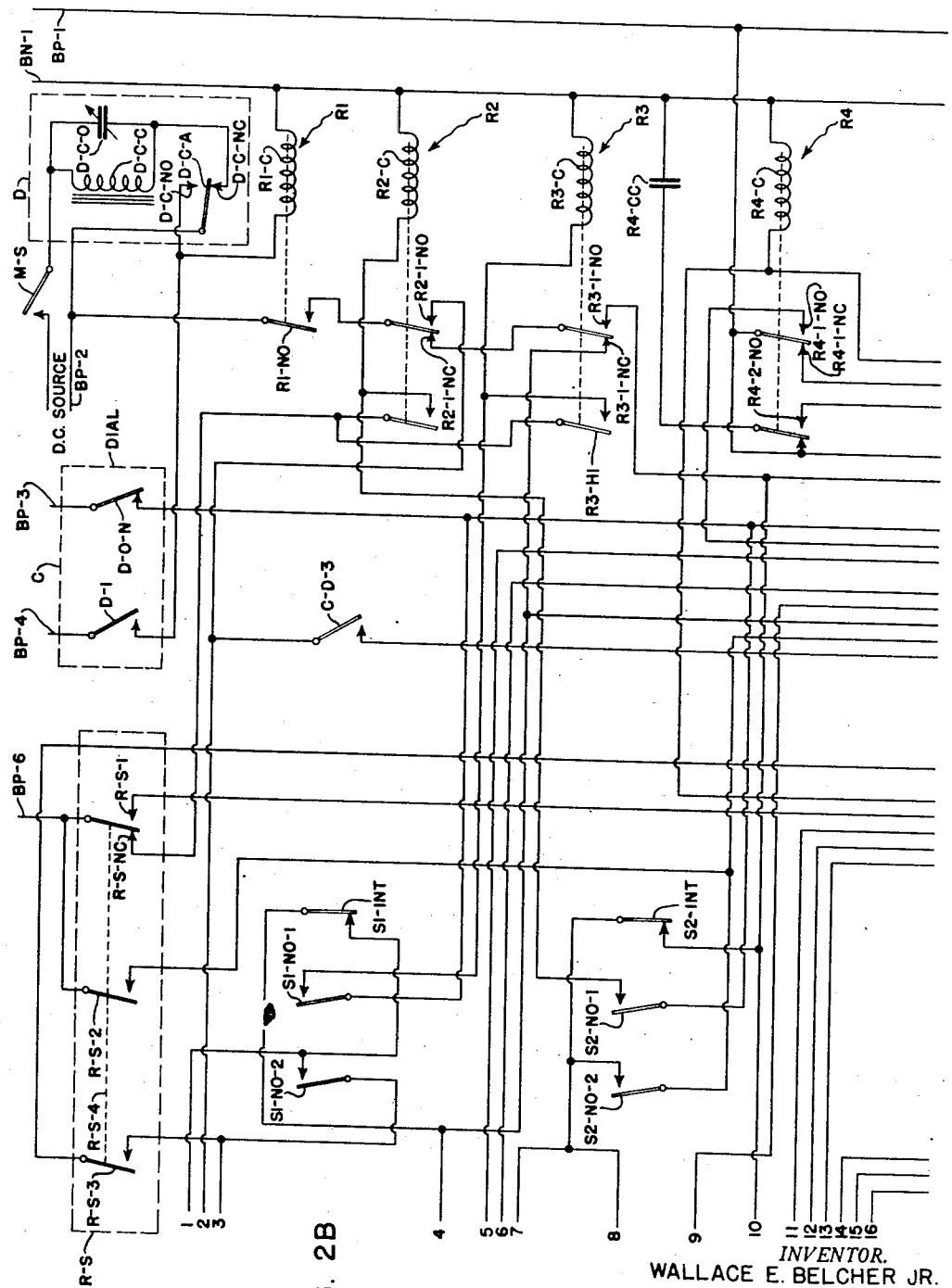
Figure 2C:
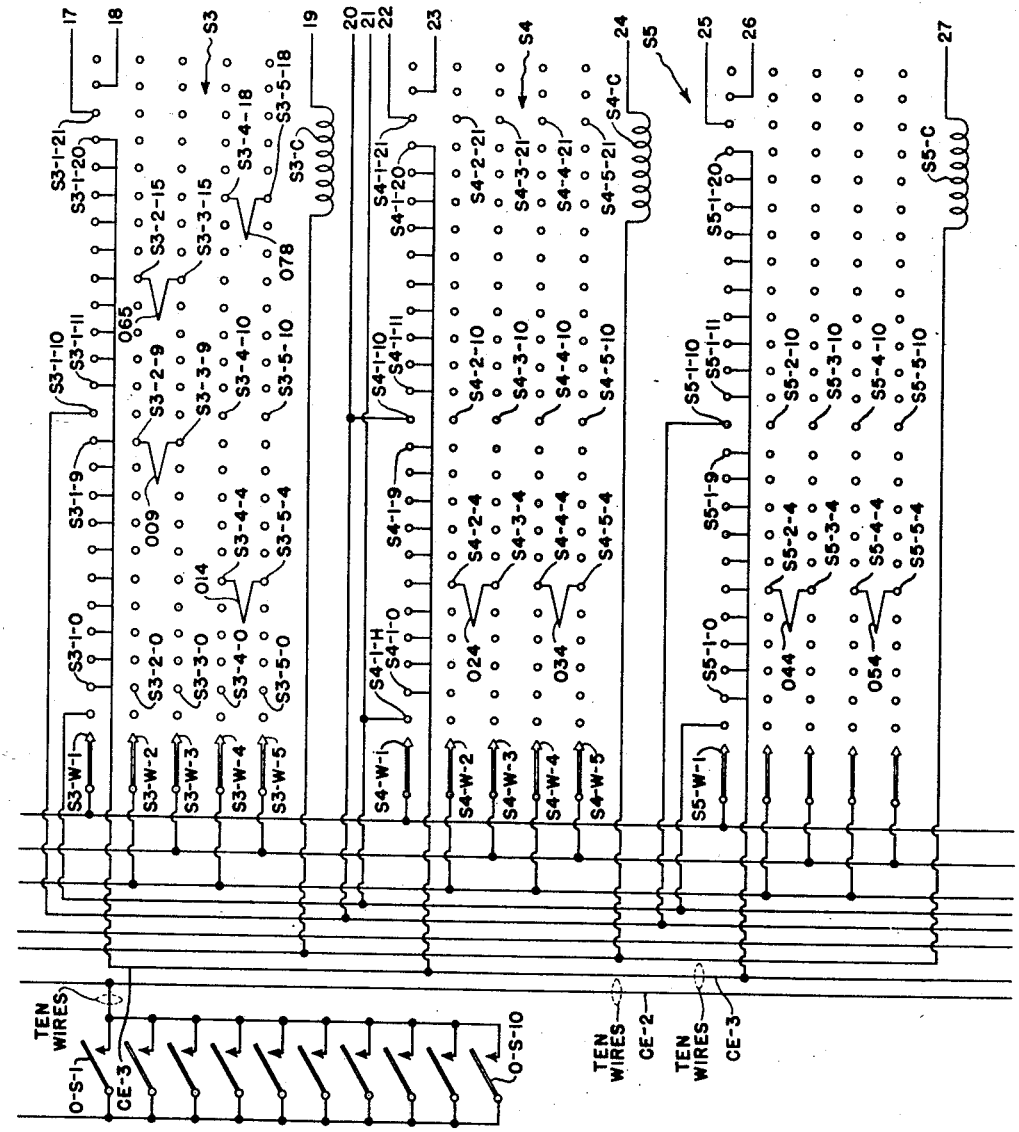
Figure 2D:
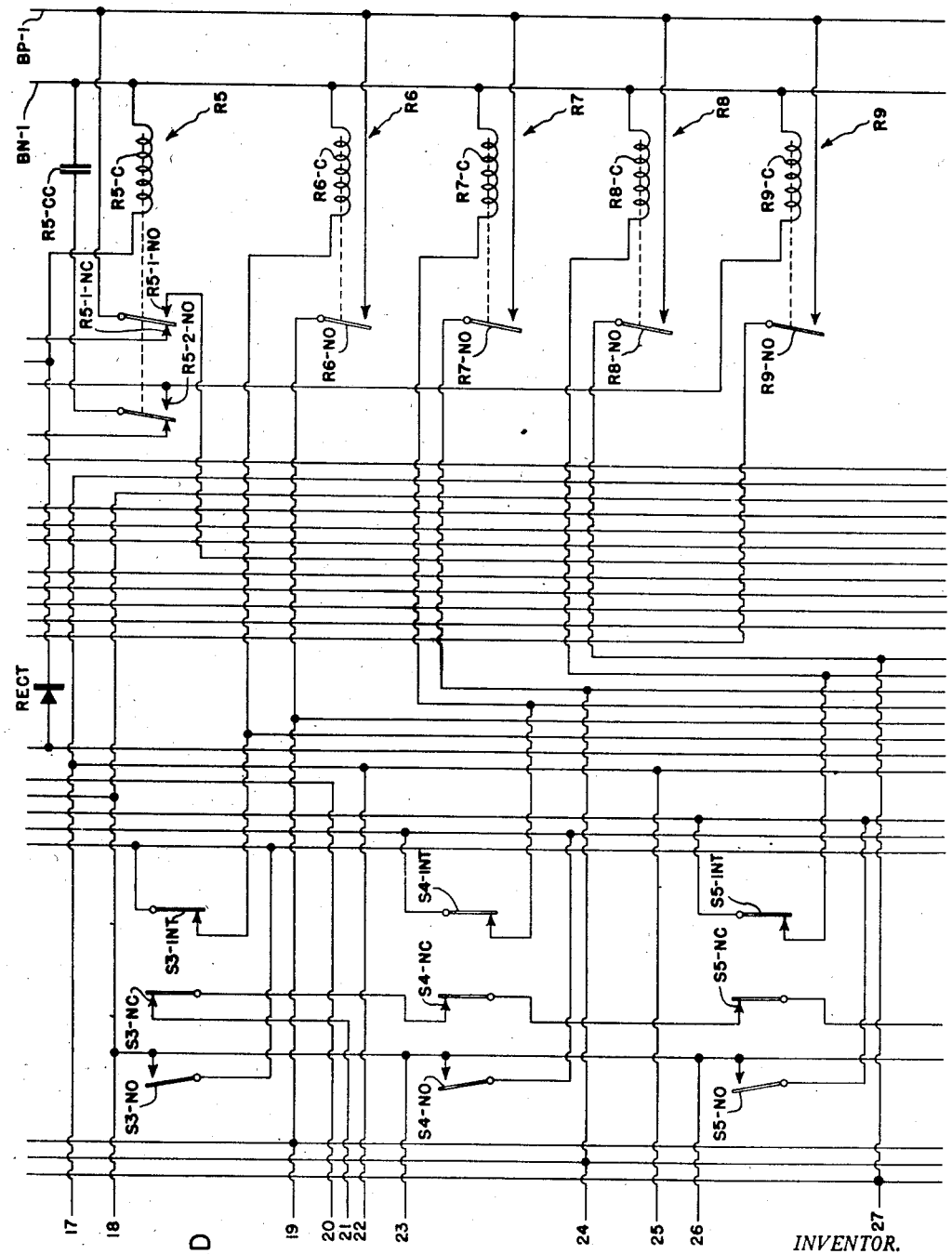
Figure 2E:
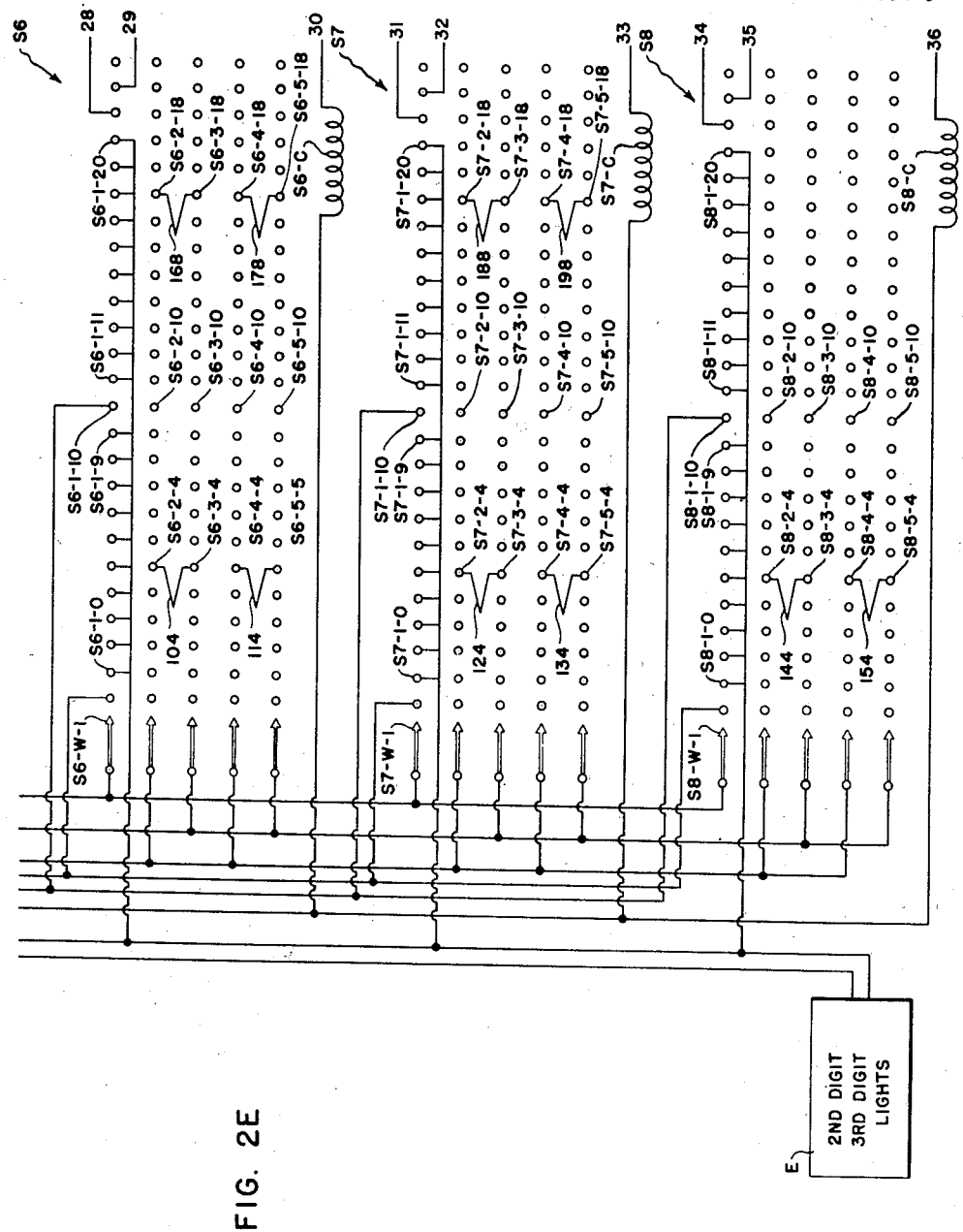

Figs. 2A, 2B, 2C, 2D, 2E and 2F are parts of one electric circuit diagram of the selector portion of the system. Fig. 2A is the upper left portion. Fig. 2B is the upper right portion. Fig. 2C is the center left portion. Fig. 2D is the center right portion. Fig. 2E is the lower left portion. Fig. 2F is the lower right portion.

Figure 3:
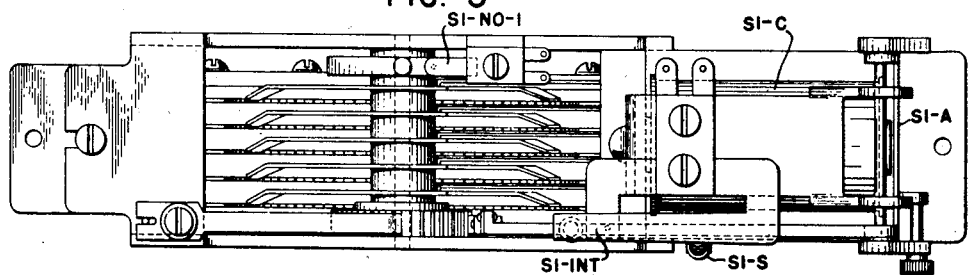

Fig. 3 is a top or plan view of one of the selector switches.

Figure 4:
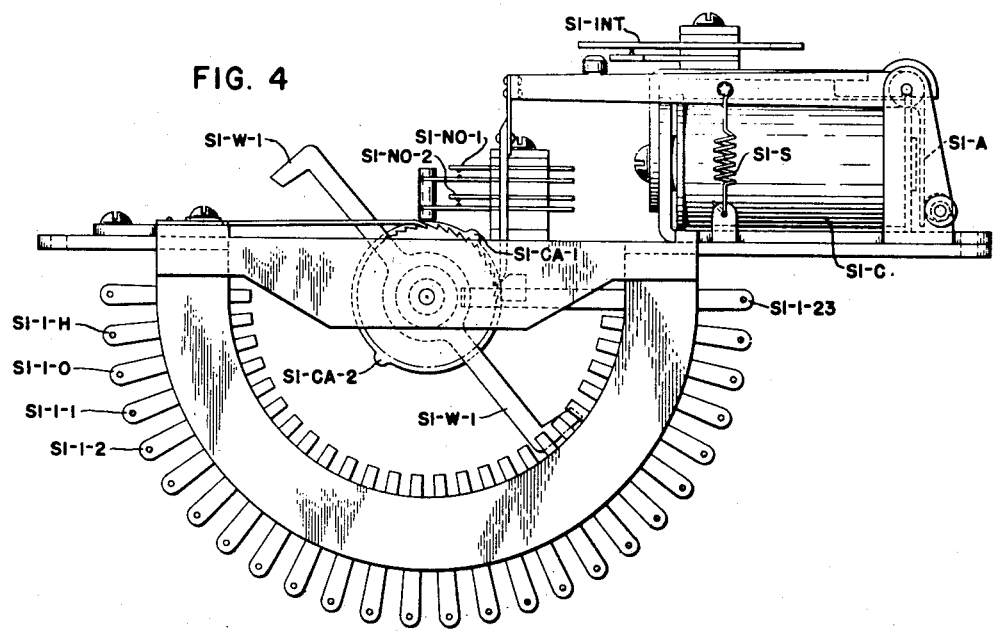

Fig. 4 is a side elevation of the same selector switch.

Figure 5:
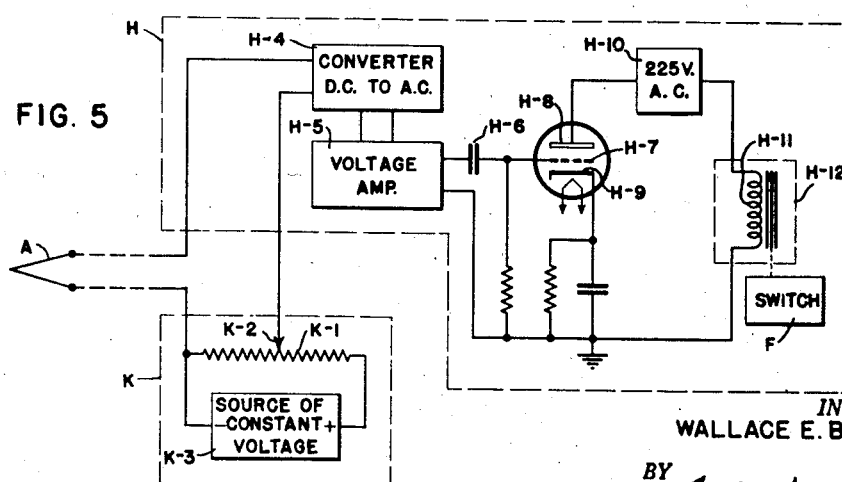

Fig. 5 is an electric circuit diagram of the scanning amplifier shown in block H of Fig. 1.

Fig. 6 (Sheet 1) is a block diagram of a modification.

Figure 7:
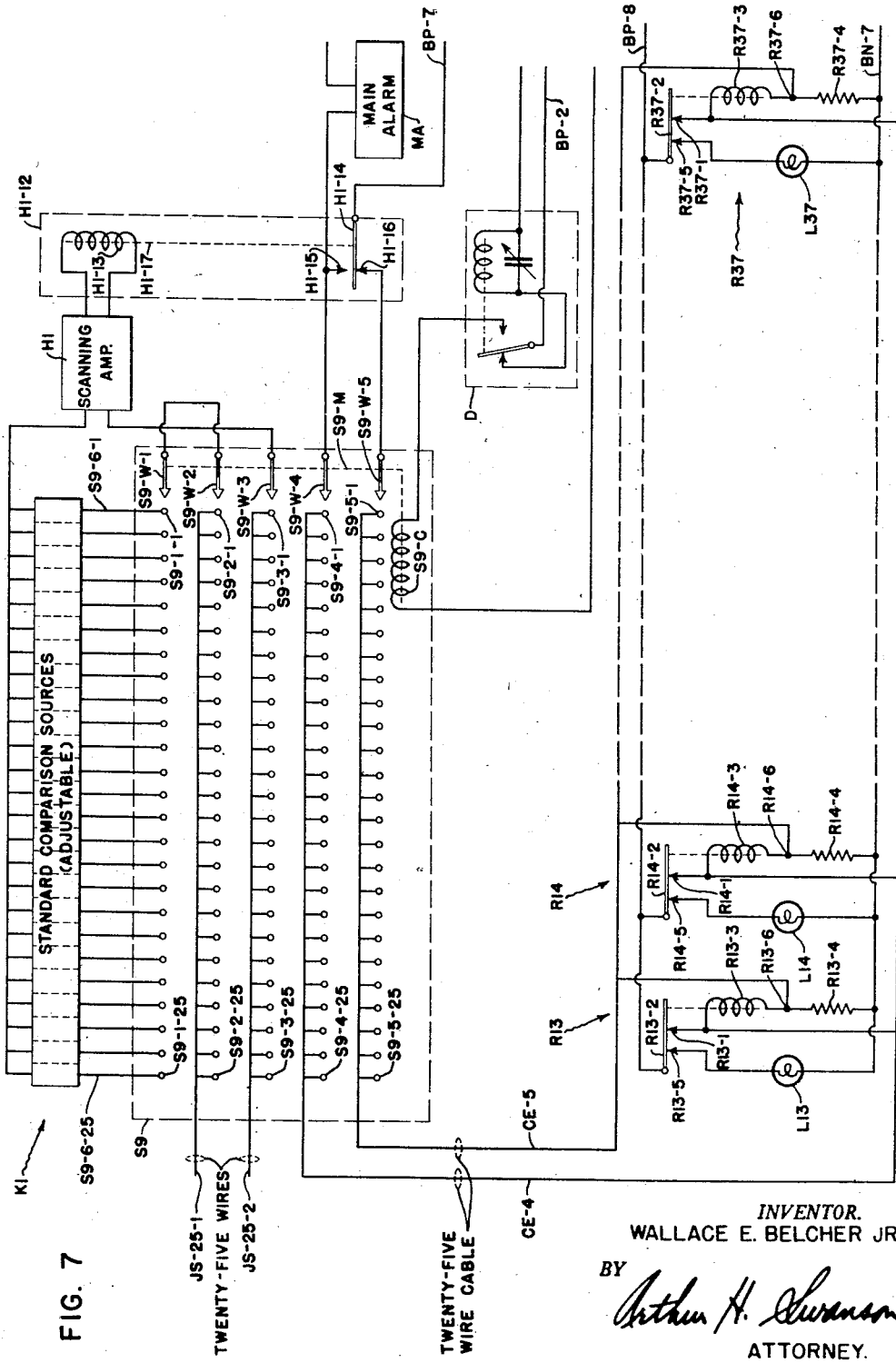

Fig. 7 is an electric circuit diagram of the same modification.

Fig. 8 is an electric circuit diagram of a second modification.

The system as a whole

Referring to Fig. 1, block A comprises a plurality of measuring instruments, especially those which produce a voltage in response to the primary variable being measured. Thermocouples are an example.

The voltage from these measuring instruments is indicated by the solid lines and is fed to one or more selector switches indicated at B in Fig. 1. The function of selector switches B is to make connection with one of the plurality of measuring instruments.

To this end, switches B may be manually operated. Block C indicates a means for doing this, such as a dialing system similar to that in common use in telephone systems. A dotted line indicates this operating connection.

Alternatively, switch B may be actuated automatically by means of an automatic operator or scanner D, so as to connect each of the measuring instruments in turn. In other words, switch B may be automatically actuated so as to scan all of the measuring instruments in a time cycle. A dotted line indicates this operating connection.

An external voltage is fed by switch B to an identifying indicator shown at block E through a multiple conductor cable, the proper conductors being selected by switch B so as to intelligently indicate its position and thus the identity of the measuring instrument connected at any particular time. Such an indicator may be a bank of thirty electric lamps arranged in rows of ten each. Each one of the lamps is provided with suitable identifying symbols so that each lamp, when illuminated, indicates one digit of an identifying number corresponding to a number arbitrarily assigned to a particular measuring instrument. A dash-and-dot line indicates this connection.

The voltage from the connected measuring instrument A is fed, as indicated by a solid line, to a transfer switch F, which may be simply a double-pole, double-throw switch actuated manually by a manual switch operator G and also operated automatically by a scanning amplifier H by means of a relay as explained more in detail hereinafter. Dotted lines indicate the operating connections from operator G and from scanning amplifier H to transfer switch F.

Connected to or forming a part of the scanning amplifier H is a comparison unit K. Unit K comprises one or more sources of voltage to which the instantaneous voltage of each of the thermocouples is compared. If unit K includes only one source of voltage, all the thermocouples A must be compared to it. Therefore, all the thermocouples cause an indicating and/or recording and/or controlling action with reference to the same preselected voltage. If unit K includes more than one source of voltage, each of the thermocouples A may be compared to the same or to a different source of voltage. Therefore, each of the thermocouples may cause an action to take place with reference to the same or a different voltage.

Switch F connects the selected voltage either to scanning amplifier H or to an indicator, a recorder, or a controller J, which may be any of the well known potentiometer or other electrical indicating, recording or controlling devices now on the market. These connections are indicated by solid lines.

When the scanning amplifier H is energized by a voltage corresponding to a measurement of the selected measuring instrument A, which measurement is either at, or above or below a predetermined selected value for that measuring instrument, scanning amplifier H may cause one or more of the following actions to take place.

1. The connection between the automatic operator D and selector switch B may be broken. This causes switch B to cease its scanning.

2. Alternatively or at the same time, scanning amplifier H may actuate transfer switch F so that the selected measuring instrument A is connected to the indicator, recorder or controller J causing an indication, record or controlling action in response to the value measured by the selected measuring instrument. Selector switch B must cease scanning when it is connected to indicator, recorder or controller J or, at best, selector switch B can only continue its scanning operation at a rate which permits the indicating, recording or controlling action of J to take place while J is connected to each particular thermocouple.

3. Alternatively or at the same time an alarm LA or other signal may be operated to draw the attention of those operating the process or device.

4. Alternatively or simultaneously, the identifying indicator E may be actuated to identify the measuring instrument which has caused the action.

Electric circuit connections

Referring now to Figs. 2A–2F, it will be seen that the system includes eight, twenty-five point, five-level, rotary switches marked with the reference characters S1 to S8, inclusive, and shown in greater detail in Figs. 3 and 4. Switch S1 connects those lamps of the identifying indicator E, which indicate the first digit of the number identifying each thermocouple e. g. 0, 1 or 2 into circuit. Switch S1 connects terminal BN—3 into circuit. No thermocouples are connected to switch S1. Switch S2 connects the voltage from each thermocouple through the wipers S2—W—1 and S2—W—2, through the transfer switch F to either the scanning amplifier H or measurement responsive device J. No thermocouples are directly connected to switch S2. The individual thermocouples each are connected directly to two of the stationary contacts of switches S3 to S8, each two contacts forming a separate pair. For example, that thermocouple which is identified by identifying indicator E by the first, second and third digit lights 009 is connected to terminals S3—2—9 and S3—3—9 of switch S3. Also the thermocouple identified as 065 is connected to terminals S3—2—15 and S3—3—15 of switch S3. The terminals S3—2—9 and S3—2—15 are swept by wiper S3—W—2 during one cycle while terminals S3—3—9 and S3—3—15 are simultaneously swept by wiper S3—W—3. Thus either thermocouple 009 or thermocouple 065 is individually connected into circuit by wipers S3—W—2 and S3—W—3. It should be noted that no thermocouple is connected across any of the terminals 10, e. g. terminals S3—4—10 and S3—5—10, S4—2—10, S4—3—10, S4—4—10, S4—5—10, etc. This is because the terminals S3—1—10, S4—1—10, S5—1—10, S6—1—10, S7—1—10 and S8—1—10 are connected from terminals S4—1—10 by wire 20 (Figs. 2C, 2D, and 2B) to the coil R4—C of relay R4 and the contact R5—1—NC of relay R5. Stationary contacts S3—1—10, S4—1—10, etc. are for the purpose of providing one extra pulse between each ten thermocouples scanned. For each one hundred thermocouples scanned two extra pulses must be provided and likewise one more extra pulse must be used for each decimal place added.

The following tabulation shows the connections of a few thermocouples which have been selected as examples.

| Thermocouple number | Stationary Contacts | Wipers |
|---|---|---|
| 014 | S3-4-4, S3-5-4 | S3-W-4, S3-W-5 |
| 024 | S4-2-4, S4-3-4 | S4-W-2, S4-W-3 |
| 034 | S4-4-4, S4-5-4 | S4-W-4, S4-W-5 |
| 044 | S5-2-4, S5-3-4 | S5-W-2, S5-W-3 |
| 054 | S5-4-4, S5-5-4 | S5-W-4, S5-W-5 |
| 078 | S3-4-18, S3-5-18 | S3-W-4, S3-W-5 |
| 104 | S6-2-4, S6-3-4 | S6-W-2, S6-W-3 |
| 114 | S6-4-4, S6-5-4 | S6-W-4, S6-W-5 |
| 124 | S7-2-4, S7-3-4 | S7-W-2, S7-W-3 |
| 134 | S7-4-4, S7-5-4 | S7-W-4, S7-W-5 |
| 144 | S8-2-4, S8-3-4 | S8-W-2, S8-W-3 |
| 154 | S8-4-4, S8-5-4 | S8-W-4, S8-W-5 |
| 168 | S6-2-18, S6-3-18 | S6-W-2, S6-W-3 |
| 178 | S6-4-18, S6-5-18 | S6-W-4, S6-W-5 |
| 188 | S7-2-18, S7-3-18 | S7-W-2, S7-W-3 |
| 198 | S7-4-18, S7-5-18 | S7-W-4, S7-W-5 |

When two pairs of aligned wipers engage two pairs of aligned stationary contacts only one and not each of the thermocouples connected to these stationary contacts are put in circuit. The interconnection of the twelve relays R1—R12 prevents more than one thermocouple from being connected into circuit at one time. For example, wipers S4—W—2, S4—W—3, S4—W—4 and S4—W—5 simultaneously engage stationary contacts S4—2—4, S4—3—4, S4—4—4 and S4—5—4 but owing to the interlock between relays R4 and R5, thermocouple 024 connected to stationary contacts S4—2—4 and S4—3—4 is connected into circuit on the first sweep of wipers S4—W—2 and S4—W—3 over these contacts while thermocouple 034 remains disconnected from scanning amplifier H (Fig. 2A) during the first engagement of wipers S4—W—4 and S4—W—5 with stationary contacts S4—4—4 and S4—5—4. The connections to the rest of the individual thermocouples have been omitted from the drawings for the sake of clarity.

The system also includes twelve control relays R1 through R12. Each of these relays consists of a solenoid controlling one or more pairs of contacts. In Fig. 2 the stationary contacts to the right of the movable contacts are assumed to be normally opened while the stationary contacts to the left of the movable contacts are assumed to be normally closed. In other words, the relays R1 through R12, when energized, attract the movable switches associated with them towards the right into engagement with the adjacent stationary switch contacts.

The system also includes one dial switching mechanism of the type customarily employed in automatic telephones. For example, the automatic telephone impulse sender or dial shown in U. S. Patent 1,234,356 may be used. This is the manual operator shown in Fig. 1, block C, and in Fig. 2B, at the block marked "Dial." This sender includes two switches. Switch D—O—N is the dial off-normal switch which is normally closed. The manual operator or dialing mechanism also includes a switch D—I which is the dial interrupter switch.

The system also includes one restoring switch. The purpose of this switch is to move all the selector switches (S1—S8) to a normal or home position before the dialing operation is commenced. Fig. 2B shows this restoring switch at the left hand upper side as block R—S containing one single-pole, double-throw switch and two single-pole, single-throw switches all ganged or mechanically linked together for manual operation.

The system also includes three cycle-dial switches identified on the drawings as C—D—1, C—D—2 and C—D—3. These switches are connected in a circuit and may be ganged or mechanically linked together so as to be closed during the automatic cycling or scanning operation and to be opened during the manual or dialing operation.

The system also includes twelve omit switches. These are shown in Fig. 2C near the left as switches O—S—1 to O—S—10, inclusive, and in Fig. 2A as switches O—S—11 to O—S—12 near the upper left hand corner.

As has been already described in connection with Fig. 1, the system includes an identifying indicator E consisting of thirty lamps together with their mountings, housing and associated indicating means.

Fig. 2B shows, near the upper right hand corner, the automatic operator D for supplying power during the scanning or cycling operation. This power supply comprises a simple relay oscillator connected to a source of direct current marked "D. C. source" through a manually operable switch M—S. This oscillator comprises a coil D—C—C arranged to attract an armature D—C—A out of engagement with a contact D—C—NC and into engagement with a contact D—C—NO, and a capacitor so connected as to allow a controlled period of oscillation. For convenience, the D. C. source has been indicated in Fig. 2 at various other points as B plus or B minus.

*Selector switches S1—S8*

Figs. 3 and 4 show one physical embodiment of one of the above mentioned selector switches, for example, switch S1. This switch is rotary, having stationary contacts arranged in five banks or levels of twenty-five points each. Each of these contacts is designated S1—1—H to S1—1—23. This designates the contacts on the first bank. The contacts on the second, third, fourth and fifth banks or levels are designated S1—2—H to S1—2—23, S1—3—H to S1—3—23, S1—4—H to S1—4—23, and S1—5—H to S1—5—23 respectively. To avoid confusing the drawing, not all of these reference characters have been applied. These stationary contacts are arranged to be wiped or swept by either end of one of five double ended rotary wipers or arms S1—W—1 through S1—W—5. The operating motor is a solenoid or coil S1—C which attracts an armature S1—A which, in turn, tensions a spring S1—S. When the coil S1—C is deenergized, its bias is removed from the spring so that return stroke of the spring actuates a pawl in engagement with a tooth and thereby rotates the wipers S1—W—1 to S1—W—5 out of engagement with one stationary contact and into engagement with the next. Energizing coil S1—C also opens the normally closed contacts S1—INT. Mounted for rotation with the wipers S1—W—1 to S1—W—5 are a pair of cams S1—CA—1 and S1—CA—2. These cams serve to close the switches S1—NO—1 and S1—NO—2 twice during a complete rotation or once during a complete sweep of twenty-five points.

*Resetting operation*

Before a certain thermocouple may be selected for dialing, all the switches S1—S8 must be returned to their home or normal positions by means of the restoring switch R—S (Fig. 2B). These home positions are designated by the appropriate switch and bank reference character plus the contact character H, e. g. S1—1—H (Fig. 2A). This resetting operation is done by closing the upper, normally open contacts R—S—1, R—S—2 and R—S—3 and opening the normally closed contact R—S—NC by manually operating the movable switch contacts by means of the mechanical connection or operator R—S—4. Current is thus led from terminal BP—6, through contact R—S—1 to contacts S3—NO to S8—NO of switches S3 to S8. If switch S3 is closed or off the normal open position, then B plus reaches switch contact S3—INT, then to the coil R6—C of relay R6, to negative terminal BN—1. Energizing relay R6 closes its contact R6—NO and thus connects terminal BP—1 to the energizing coil S6—C of switch S6. When energized for a sufficient number of pulses, coil S3—C causes switch S3 to return to the normal or home position. Switch S6 does not move since B minus would not be made to both S3 and S6 simultaneously. Similar circuits can be traced from switch R—S to switches S1, S2, S4, S5, S7 and S8. This action is equivalent to hanging up a telephone. All the lights in the identifying indicator E are extinguished.

*Manual operation or dialing*

To connect thermocouple 089, for example, of bank A to the potentiometer or measuring instrument J, the manual operator or dial C is used.

The first digit, 0, is dialed. The dial interrupter switch D—I, momentarily energizes relay R1. This momentarily connects terminal BP—2 through the contacts R1—NO, R2—1—NC and R3—1—NC to the operating solenoid S1—C of switch S1. This moves the wipers S1—W—1 to S1—W—5 of switch S1 to position 000 into engagement with stationary contacts S1—1—000 to S1—5—000, respectively. Off-normal switches S1—NO—1 and S1—NO—2 of switch S1 are then closed. When the dial returns to its normal position, its off-normal switch D—O—N is closed. Direct current is fed from terminal BP—3, through switch D—O—N and switch S1—NO—1 to the coil R3—C of relay R3. Relay R3 is then energized through holding contact R3—HI and normally closed contact R—S—NC of switch R—S. Terminal BN—3 (Fig. 2A) is connected through wiper S1—W—5, stationary contact S1—5—000 to the operating coils S3—C, S4—C and S5—C, which are the group of switches connected to the thermocouples so numbered as to have zero as a first digit. When the contacts R3—1—NO and R3—HI are closed, the dial pulses go through relay R1. Pulses of B plus go through contact R1—NO, contact R2—1—NC, and contact R3—1—NO to the coil S2—C of switch S2.

The next number, 8, is then dialed. These pulses energize coil S2—C and move the wipers of switch S2 into engagement with the stationary switch contacts S2—1—80 to S2—5—80, respectively. When all the switches S1 through S8 are in the home or bottom position, i. e. with their wipers in engagement with the bottom stationary contacts next above the position in which the wipers are shown in Fig. 2, connection is made from terminal BP—5, through wiper S4—W—1, stationary contact S4—1—H, switch S3—NC, switch S4—NC, switch S5—NC, switch S6—NC, switch S7—NC, switch S8—NC to a junction point and thence upward through rectifier RECT to coil R5—C of relay R5. When relay R5 is energized, current is fed from terminal contact BP—1, switch contacts R5—1—NO, switch contacts R11—2—NO, to wiper S2—W—4 of switch S2. Relay R11 is necessary in order that this connection be not made until the dial has returned to normal and switch S2 has reached its final position. Once this connection has been established, wiper S2—W—4 feeds B plus through stationary contact S2—4—80 to the interrupter contact S4—INT on switch S4. This energizes the coil R7—C of relay R7, which, in turn, through its contacts R7—NO energizes the coil S4—C of switch S4. When this happens, the energization of coil S4—C causes the wipers of switch S4 to be moved one space so that contact S4—INT is opened. This deenergizes coil S4—C. Switch S4—INT closes and the sequence of operations just referred to again takes place so that coil S4—C is again energized and the cycle repeats until S4 has advanced so that its wipers are in engagement with the stationary contacts S4—1—10 to S4—5—10. In this position a circuit is closed through coil R4—C of relay R4 which pulls in and opens circuit at stationary contact R4—1—NC which is connected to R5 so that coil S4—C is deenergized and switch S4 stops moving. In the meantime, switch S2—NO—1 has connected switch D—O—N to the coil R2—C of relay R2. Thus, when the dial has returned to its normal position, switches D—O—N and S2—NO—1 are closed so that relay R2 is energized.

The circuit is now in readiness for the third series of dial pulses. These pulses come from terminal BP—2, through contacts R1—NO, switch R2—1—NO, wiper S2—W—5, stationary contact S2—5—80 to coil S4—C of switch S4. The third number may now be dialed. In the above example, nine pulses are fed to coil S4—C. Switch S4 is stepped until its wipers engage with the stationary contacts S4—1—21 to S4—5—21.

As has been pointed out, the thermocouples are connected by means of the wipers S2—W—1 and S2—W—2 to the proper wipers of S3, S4, S5, S6, S7 and S8. Actually, a twelve wire cable is required to make these connections.

In the example illustrated in Fig. 2A for use with two hundred thermocouples, connections are made to the lamps which indicate the first digits of the identifying indicator E by means of two wires forming cable CE—1, connecting to the stationary contacts S1—1—000 and S1—1—100, respectively. Fig. 2C shows that connections are made to the lamps which indicate the second digits of the identifying indicator E by means of ten wires forming a cable CE—2 and connected to the stationary contacts S2—4—00 to S2—4—50 and S2—3—60 to S2—3—90, respectively. Connections are made to the lamps representing the third digits of the identifying indicator E by means of ten wires constituting a cable CE—3 and connected respectively to the stationary contacts S3—1—0 to S3—1—9, S3—1—11 to S3—1—20, S4—1—0 to S4—1—9, S4—1—11 to S4—1—20, S5—1—0 to S5—1—9, S5—1—11 to S5—1—20, S6—1—0 to S6—1—9, S6—1—11 to S6—1—20, S7—1—0 to S7—1—9, S7—1—11 to S7—1—20, S8—1—0 to S8—1—9 and S8—1—11 to S8—1—20.

If, instead of the thermocouple 089 selected as an example, the thermocouple 039 had been selected as an example, the operation is similar to that already described except that switch S4 is not stepped until its wipers engage with the stationary contacts S4—1—10, etc., before dialing the third number. Since relay R5 is energized, current is fed to wiper S2—W—4 of switch S2. When wiper S2—W—4 engages stationary contact S2—4—30, light 30 is energized. Since relay R4 is not energized, coil S4—C of switch S4 is not energized. When the equipment is set for dialing, between each ten thermocouples scanned, it is necessary to provide one extra pulse. Similarly for one hundred thermocouples and for one thousand thermocouples, two or three extra pulses, respectively, must be provided.

*Automatic operation or cycling or scanning*

To prepare the apparatus for automatic operation, it is only necessary to close the cycle-dial switches C—D—1, C—D—2 (Fig. 2A) and C—D—3 Fig. 2B). If the apparatus has been previously cleared by the use of the restoring switch R—S, closing these cycle-dial switches will automatically advance the wipers of switches S1 and S2 into engagement with the stationary contacts S1—1—000, etc., and S2—1—00 etc., respectively. For example, closing switch C—D—1 causes current to flow from terminal BP—5 through wiper S1—W—1, stationary contact S1—1—H, switch C—D—1, switch S1—INT, and coil S1—C of switch S1 to terminal BN—3.

The power pulses for the automatic operation to be described come from the automatic operator (indicated in Fig. 1, block D and shown in Fig. 2B, upper right hand corner) connected to the coil R1—C of relay R1. This is a simple relay oscillator which, when manually operable switch M—S is closed, feeds pulses from its positive terminal BP—2, movable contact D—C—A, stationary contact D—C—NC, coil D—C—C to its negative terminal. Energization of coil D—C—C attracts movable contact D—C—A out of engagement with stationary contact D—C—NC and into engagement with stationary contact D—C—NO. Engagement of contacts D—C—A and D—C—NO sends a positive pulse through the coil R1—C of relay R1. The frequency of operation of relay oscillator D is determined by the adjustable capacitance D—C—O placed across it. This capacitance may be readily varied to obtain reliable action of the stepping switches S1—S8 at speeds of between one and twenty steps per second.

Since the off-normal switches S1—NO—1 and S1—NO—2 of switch S1 and switch S2—NO—1 and switch S2—NO—2 of switch S2 are closed, energizing R2—C, any operation of relay R1 will feed B plus to the wiper S2—W—5 of switch S2. Wiper S2—W—5 is so positioned as to engage stationary contact S2—5—00 of switch S2 and thus connect coil S3—C of switch S3 and the coil S6—C of switch S6 into the circuit. The circuit may be traced in Figs. 2B and 2A from BP—2, switch R1—NO, switch R2—1—NO, wiper S2—W—5, stationary contact S2—5—00 to the coils S3—C and S6—C. All five wipers of any switch move at the same time. Selection of levels 2 and 3 or 4 and 5 on switches S3—to—S6 as input to the potentiometer J is made by switch S2.

Stationary contact S1—5—000 of switch S1 connects the terminal BN—3 to the coils of switches S3, S4 and S5, however, the coil S3—C of switch S3 is the only one connected in circuit. Thus the pulses from the automatic operator D step switch S3 so that its wipers engage with the stationary contacts S3—1—0, etc., up to stationary contacts S3—1—9, etc.

The next pulse will move switch S3 so that its wiper S3—W—1 engages stationary contact S3—1—10. A circuit may be traced from terminal BP—5, wiper S3—W—1, stationary contact S3—1—10 through the coil R4—C of relay R4, energizing it. Relay R4 will pull in so that its contacts R4—1—NC, which are connected to the coil R5—C of relay R5, are broken and relay R5 drops out. The contact R4—2—NO is connected to the coil R9—C of relay R9. The contact R4—1—NO is connected to the contact R11—1—NO of relay R11. The action of condenser R4—CC is to energize relay R9 momentarily. A circuit can be traced from terminal BP—1 through contact R9—NO, coil S3—C, stationary contact S1—5—000, and wiper S1—W—5 to terminal BN—3. This energizes coil S3—C and steps switch S3 one position. This action is of value later, but of no consequence at this point.

Contact R4—1—NO of relay R4 closes circuit from terminal BP—1 to contact R11—1—NO of relay R11. Since relay R11 is energized because the dial off-normal switch D—O—N is closed, switch R11—1—NO is connected to wiper S2—W—3. As this wiper engages stationary contact S2—3—00 circuit is made to switches S3—INT and S6—INT. In as much as coil S3—C is connected to terminal BN—3 through a circuit already traced, switch S3—INT, under the control of relay R6, steps switch S3 through the remainder of its cycle until the stationary contacts S3—1—H, etc., are engaged. A circuit can be traced from terminal BP—1, contact R11—1—NO, wiper S2—W—3, stationary contact S2—3—00 and switch S3—INT, of switch S3, since this switch is closed, and the coil R6—C of relay R6 to negative terminal BN—1.

Switch S3—INT under the control of coils S3—C and R6—C steps switch S3 through its second half until it gets to its home position. Here circuit may be traced from terminal BP—5 through wiper S3—W—1, stationary contact S3—1—H and switches S3—NC etc., of switches S3 to S6 in series, all being closed. From switch S6—NC circuit may be traced through rectifier RECT to the coil R5—C of relay R5. Relay R5 pulls in, relay R4 drops out, and switch S3 stops moving. However, when relay R5 pulls in, condenser R5—CC discharges through switch R5—2—NO and coil R9—C of relay R9. Circuit is closed from positive terminal BP—1 through switch R9—NO, switch C—D—3, wiper S2—W—5, stationary contact S2—5—10, coil S3—C, stationary contact S1—5—000 and wiper S1—W—5 to negative terminal BN—3.

When relay R9 drops out, switch S3 advances. As wiper S3—W—1 engages stationary contact S3—1—21, coil R10—C of relay R10 is connected into circuit. When relay R10 is thus energized, its contacts R10—1—NO energize solenoid S2—C of switch S2 through the following circuit: terminal BP—1, contacts R10—1—NO, coil S2—C to negative terminal BN—3. Simultaneously, relay R10 energizes the solenoid S3—C of switch S3 through the following circuit: terminal BP—1, contacts R10—2—NO, switch S3—NO, switch S3—INT, coil R6—C to negative terminal BN—1. This energizes relay R6 which closes the circuit from terminal BP—1 through coil S3—C and thus steps S3 to the position in which its wipers engage the stationary contacts S3—1—23, etc. Switch S3 continues to advance to its home position in which its wipers engage stationary contacts S3—1—H, etc.

When switch S3 reaches home position, relay R5 is energized, relay R9 is energized momentarily, and switch S3 moves to a position in which its wipers engage the stationary contacts S3—1—0, etc. Switch S3 is now ready to step through the positions in which its wipers S3—W—4 and S3—W—5 engage the stationary contacts S3—4—0 to S3—4—9 and stationary contacts S3—5—0 to S3—5—9, respectively.

Note that switch S2 is energized and de-energized before switch S3 reaches its home position. Thus, after switch S3 has passed the position in which its wipers engage stationary contacts S3—4—9, etc., and is automatically returning to home position again, switch S2 will move to the position in which its wipers engage stationary contacts S2—1—20, etc., before condenser R5—CC is discharged through coil R9—C of relay R9. Thus the pulses from the contact R9—NO of relay R9 are sent to the wiper S2—W—5 and reach solenoid S4—C of switch S4. This prepares switch S4 to step its wipers S4—W—2 and S4—W—3 through engagement with stationary contacts S4—2—0 to S4—2—9 and S4—3—0 to S4—3—9, respectively. This action continues until switch S5 has stepped into engagement with stationary contacts S5—5—9, etc.

When switch S2 is advanced by stepping switch S5 past the contacts S5—1—21, etc., the situation becomes slightly different. When switch S5 reaches home, relay R5 pulls in and closes a circuit through wiper S2—W—4 through switch S3—INT. Switch S3 advances so that its wipers engage stationary contacts S3—1—10, etc. Relay R4 pulls in, and stops the motion by energizing relay R9 to step switch S3 so that its contacts engage with stationary contacts S3—1—11, etc. The action then continues in similar manner until the wipers of switch S4 engage stationary contacts S4—5—21, etc.

When switch S4 advances switch S2 to the position in which the wipers of switch S2 engage the stationary contacts S2—1—100, etc., switch S2 advances itself to its home position. As switch S2 passes through the position in which its wipers engage stationary contacts S2—3—20, etc., it energizes the coil R12—C of relay R12. Relay R12, in turn, maintains the motion of switch S2 and sends a momentary pulse through the solenoid S1—C, advancing switch S1.

The cycle-dial switch C—D—2 allows switch S2 to reach the position in which its wipers engage with stationary contacts S2—1—99, etc., but switch S4 reaches home and operates relay R5 while switch S2 is still moving. Therefore, the operation of relay R9 does not result in the motion of any of the third digit switches S3 to S8, inclusive, thus an extra pulse is required between each hundred thermocouples stepped.

Instead of the relay oscillator D shown in the drawings, the impulse switch of a strip chart potentiometer may be used to operate the scanning cycle. This impulse switch is connected to operate relay R1 periodically sending pulses through the proper points to operate the switches.

*Comparison unit K*

As shown in Fig. 5, the comparison unit K comprises a manually setable comparison potentiometer, which is made up of a slide wire resistance K—1 with which cooperates a sliding contact K2. Contact K2 may be adjusted manually or automatically so as to vary the comparison voltage with which the voltage of each of the measuring instruments or thermocouples A is compared. Connected across the ends of the slide-wire K—1 is a source of constant voltage K—3. Voltage source K—3 may well be a potentiometer network including a cell, a standard cell, switches, and rebalancing resistor connected together in a well known manner so that the potentiometer can be periodically calibrated and, if necessary, rebalanced to compensate for any loss in voltage by the cell regularly used.

*Scanning amplifier H*

The positive terminal of each of the thermocouples A is connected in succession to scanning amplifier H which includes a converter H—4 which converts the thermocouple D. C. to A. C. Such converters are well known and may readily consist of a reed vibrating between a pair of stationary contacts under the influence of an energizing coil. Scanning amplifier H operates at a suitable frequency of from 60 to 1000 cycles per second.

The output of converter H—4 is fed to a voltage amplifier H—5 which may likewise be any of the electronic circuit devices well known for this purpose.

The output of the voltage amplifier H—5 is fed through a condenser H—6 to the grid H—7 of a vacuum tube, shown as a triode having a plate H—8 and a cathode H—9. In the plate circuit of this tube is connected a source of A. C. (H—10). This is a power source and may conveniently be a transformer winding which supplies 225 volts A. C. either in phase or 180 electrical degrees out of phase with the output of converter H—4. Also connected in this plate circuit is the coil H—11 of relay H—12. Relay H—12 may be connected mechanically so as to actuate transfer switch F.

Amplifier H is connected to the selected thermocouple A so that no current flows when the thermocouple voltage is equal and opposite to the voltage of source K—3, as adjusted by slide-wire K—1 and its cooperating contact K—2. When one voltage exceeds the other, current will flow. If it is desired to operate the relay H—12 when the thermocouple voltage exceeds the source voltage, it only is necessary to connect the converter H—4 to the thermocouple A with the proper polarity. In such case so long as the thermocouple voltage is equal to or less than the source voltage, the relay does not operate. However, when the thermocouple voltage exceeds the source voltage, the relay pulls in and operates transfer switch to connect the selected thermocouple A to the indicator or recorder J (see Fig. 1) and disconnects the automatic operator D from the selector switch B (see Fig. 1) so that the selector switch stops, leaving the selected thermocouple A connected to the identifying indicator E, so that its identity is known because of the number displayed by the lights E, and connected to the indicator, recorder or controller J so that a suitable indication, record or control action is given.

Obviously, the relay H—12 may be made to operate whenever the thermocouple voltage is equal to or less than the source voltage, by reversing the polarity with which the thermocouple A is connected to the converter H—4.

Modification of Figs. 6 and 7

Figs. 6 and 7 show a modified manually or automatically operated electric selector circuit in which a plurality of comparison sources are provided so that each thermocouple may be compared to a different source and thus initiate a measuring, recording or controlling action at a different value.

Fig. 6 is a block diagram in which the plurality of measuring instruments are indicated at A. These measuring instruments may well be thermocouples. A jack strip JS or other terminal facility is provided for connecting the thermocouples.

An indicating, recording or controlling instrument J1 may be directly connected to selected ones of the thermocouple terminals at the jack strip JS. The device J1 may be, for example, a sixteen point, recording potentiometer connected to those thermocouples located at the points in the process or apparatus under observation, which points are of greatest interest or where trouble is most likely to occur.

The opposite terminals of each thermocouple are connected to two contacts of a switch S9 (shown in greater detail in Fig. 7). Certain contacts of the rotary switch S9 are connected to a plurality of relays R which are in turn connected to a plurality of alarms, such as lights L. A plurality of comparison units K1 are also connected to certain contacts of switch S9, these same contacts being also connected to a scanning amplifier H1. The scanning amplifier controls a main alarm MA while the relays R also control individual alarms IA.

The scanning amplifier and its relay are capable of detecting less than fifty microvolts at a speed of ten points per second. This is less than 2° F. using an iron-constantan thermocouple and is less than the tolerance commercially available on thermocouples. For most reliable operation, however, a slightly lower speed of scanning is recommended. At a speed of thirty points in five seconds, or six per second, operation is entirely satisfactory.

Fig. 7 shows that switch S9 may be of the type shown in Figs. 3 and 4. Power for switch S9 is supplied from a suitable source of D. C. power (not shown) by means of a relay oscillator D similar to that described in Figs. 2A-2F. The output of oscillator D is fed to the operating coil S9—C which has an armature having a mechanical connection S9—M with the five wipers S9—W—1 to S9—W—5. The wipers S9—W—1, etc., engage successively with each one of twenty-five stationary contacts arranged in five rows or banks. Contacts S9—1—1 to S9—1—25 form the first row or bank while contacts S9—5—1 to S9—5—25 form the fifth bank, the numbering being similar to that employed in connection with switches S1 through S8.

The thermocouple extension leads are led from the jack strip JS (Fig. 6) by two, twenty-five wire cables JS—25—1 and JS—25—2 to the switch contacts. Cable JS—25—1 (Fig. 7) leads to switch contacts S9—2—1 to S9—2—25, inclusive. Cable JS—25—2 leads to switch contacts S9—3—1 to S9—3—25, inclusive. Switch contacts S9—1—1 to S9—1—25, inclusive, are each connected by an individual conductor S9—6—1 to S9—7—25, inclusive, to a standard comparison source forming one of the standard comparison sources indicated by the block K1. Each of these standard comparison sources is similar to the standard comparison source K shown in Fig. 5.

The opposite side of each of the standard comparison sources K1 is connected by a single cable to the scanning amplifier H1 similar to the scanning amplifier H shown in Fig. 5. Scanning amplifier H1 is, in turn, connected to a relay H1—12 having a coil H1—13 controlling an armature H1—17 mechanically connected to a movable contact H1—14 adapted for engagement with either one of a pair of stationary contacts H1—15 or H1—16. Contact H1—15 is connected to the main alarm MA and to wiper S9—W—4. Contact H1—16 is connected to wiper S9—W—5.

The operation of the modification of the invention shown in Figs. 6 and 7 is as follows: Assume that the wipers S9—W—1 to S9—W—5, inclusive, are in contact with the stationary switch contacts S9—1—1 to S9—5—1, inclusive. The voltage produced by the first thermocouple, in response to the temperature measured by it, is conducted to jack strip JS and through one wire of each of the cables JS—25—1 and JS—25—2 to contacts S9—2—1 to S9—3—1, respectively. From contact S9—2—1 this voltage is led through wiper S9—W—2, wiper S9—W—1, stationary contact S9—1—1, and conductor S9—6—1 to a standard comparison source forming part of K1. From this comparison source K1 the voltage proceeds to the scanning amplifier H1, wiper S9—W—3, stationary contact S9—3—1 and one of the wires of cable JS—25—2 back to the other side of the connected thermocouple. When any thermocouple, connected in a circuit similar to that just described, is equal to or varies from its desired control temperature (depending upon the polarity with which the thermocouple is connected), which temperature is measured by the selected standard source K1, the scanning amplifier H1 operates its relay H1—12 when the switch S9 connects the selected thermocouple to the scanning amplifier H1. Energization of relay coil H1—13 moves contact H1—14 away from stationary contact H1—16 and into engagement with stationary contact H1—15. Since movable contact H1—14 is connected to the positive terminal BP—7 of a power supply (not shown) capable of delivering 3 amperes D. C. at fifty volts, B plus from stationary contact H1—15 is fed through wiper S9—W—4 to the stationary switch contacts S9—4—1 through S9—4—25 as the wiper S9—W—4 steps over these stationary contacts. A twenty-five wire cable CE—4 connects each one of the stationary contacts S9—4—1 to S9—4—25 to a stationary holding contact R13—1 to R37—1, each included in one of the relays R13 to R37.

Relays R13 to R37 also each include a movable armature R13—2 to R37—2. Each of these armatures is under the control of a relay coil R13—3 to R37—3. The contacts R—13—1 to R37—1 are each connected through the coils R13—3 to R37—3 and through resistors R13—4 to R37—4, to negative terminal BN—7 of the power supply. When relay H1—12 closes contacts H1—14 and H1—15, the wiper S9—W—4 feeds B plus to the stationary contact S9—4—1 to S9—4—25, on which it is resting and thereby energizes the coil of the relay R13 to R37, which is connected to the stationary contact so engaged. This energizes coil R13—3 to R37—3 of the relay so selected and causes its armature R13—2 to R37—2 to be engaged with its cooperating holding contact R13—1 to R37—1 and also to be engaged with a second stationary contact R13—5 to R37—5. Each of these latter stationary contacts is connected to an alarm light L13 to L37, which forms one of the alarm lights L (Fig. 6). Instead of an alarm light L, an individual alarm 1A (Fig. 6), adapted to give an audible or other non-visual alarm, may be caused to operate when one of the armatures R13—2 to R37—2 engages one of the stationary contacts R13—5 to R37—5. Closure of one of the armatures R13—2 to R37—2 and one of the stationary contacts R13—5 to R37—5 causes the selected alarm light L13 to L37 to shine and thereby indicate that the corresponding thermocouple A is above, at or below the voltage to which the corresponding standard comparison source K1 is set, depending upon the polarity with which the standard comparison source K1 is connected. The stepping switch S9 continues to move its wipers but the selected alarm light L13 to L37 remains lit due to the closure of the following circuit BP—8, through the selected armature R13—2 to R37—2, the corresponding stationary contact R13—1 to R37—1, coil R13—3 to R37—3, resistor R13—4 to R37—4, to BN—7.

At a subsequent time, the thermocouple A thus selected gives an opposite indication to that just described, i. e. below, at or above the voltage to which the corresponding standard comparisson source K1 is set. When the contacts of switch S9 connect that particular thermocouple into circuit, relay H1—12 is not energized. Therefore, movable contact H1—14 is not disengaged from stationary contact H1—16 and closes the following circuit; positive terminal BJ—7, movable contact H1—14, stationary contact H1—16, wiper S9—W—5, a selected one of stationary contacts S9—5—1 to S9—5—25, the corresponding wire of cable CE—5, to a selected one of the points R13—6 to R37—6 of relays R13 to R 37. Since the relay armatures R13—2 to R37—2 are all connected in parallel to the positive terminal BP—8 of the power supply and since any selected one or more of these armatures are engaged with their respective holding contacts R13—1 to R37—1, the coil R13—3 to R37—3 of any relay so energized is thus short circuited and deenergized, causing its corresponding light L13 to L37 to be extinguished.

Modification of Fig. 8

Fig. 8 discloses a modification of the selector mechanism and its associated circuits very similar to that disclosed in Figs. 6 and 7. However, an additional relay is employed to connect a measurement responsive device J which may be an indicating, recording or controlling device such as a potentiometer.

Those parts of the modification of Fig. 8 which are the same as those of the modification of Figs. 6 and 7 have the same reference characters applied to them. Thus, it will be seen that each of the thermocouples is connected by one of the wires of the twenty-five wire cables JS—25—1 and JS—25—2 to one of the contacts of a bank of contacts S9—2—1 to S9—2—25 and to one of the contacts S9—3—1 to S9—3—25, respectively. The switch S9 has five banks of contacts S9—1—1 to S9—1—25 and so on through the four banks to the fifth bank of contacts S9—5—1 to S9—5—25.

Motive power is fed to switch S9 from positive terminal BP—2 through a relay oscillator D to the switch operating coil S9—C. An armature S9—M is actuated by coil S9—C so as to actuate the five wipers S9—W—1 to S9—W—5. These wipers are mechanically connected or ganged together so that they move as one, although they are insulated from one another. The wipers successively engage the contacts of the switch S9, each wiper engaging each contact of one row or bank of stationary contacts.

The standard comparison source K1 is composed of one or more separated, manually-adjustable voltage sources similar to that disclosed in Figs 1 and 5 at K. Each of these standard comparison sources is connected by a wire S9—6—1 to S9—6—25 to one of the contacts S9—1—1 to S9—1—25 of the first row or bank of contacts of the switch S9. The opposite side of each of these standard comparison sources K1 is connected by a single cable to a scanning amplifier H1 which has a relay H1—12 controlled by it. Relay H1—12 comprises an operating coil H1—13 having a cooperating armature H1—17 which operates a movable switch arm H1—14 out of engagement with stationary contact H1—16 and into engagement with stationary contact H1—15. Movable switch contact H1—14 is biased normally into engagement with contact H1—16.

A positive terminal BP—7 is connected to movable switch arm H1—14. Stationary switch contact H1—16 is connected to switch wiper S9—W—5. Stationary contact H1—15 is connected to the main alarm MA and to the switch wiper S9—W—4. Scanning amplifier H1 is connected on the opposite side from its connection to standard comparison source K1 by means of a wire S9—1 to a stationary contact H2—1, a movable contact H2—2 and a wire S9—2 to wiper S9—W—3.

A second relay H2 has an operating coil H2—3 with which cooperates an armature H2—4 which has mechanical connection with movable switch arms H2—5, H2—2 and H2—6. Movable contact H2—5 normally engages stationary contact H2—7 but may be movable into engagement with stationary contact H2—8. Movable contact H2—6 normally engages stationary contact H2—9 but is movable into engagement with stationary contact H2—10.

The operation of the modification disclosed in Fig. 8 is as follows: Assume that the wipers S9—W—1 to S9—W—5 are each in engagement with one of the contacts S9—1—1 to S9—5—1, respectively. Further assume that the thermocouple is connected by means of one of the wires of JS—25—1 and of JS—25—2 to the contacts S9—2—1 and S9—3—1 is below, at or above the voltage to which the corresponding comparison source K1 is set. The thermocouple voltage passes through one wire of the cable JS—25—1, stationary contact S9—2—1, wiper S9—W—2, movable switch contact H2—5, stationary contact H2—7, wiper S9—W—1, stationary contact S9—1—1, wire S9—6—1, one of the comparison sources K1, scanning amplifier H1, wire S9—1, stationary switch contact H2—1, movable switch contact H2—2, wire S9—2, wiper S9—W—3, stationary contact S9—3—1, and one of the wires JS—25—2 to the opposite side of the thermocouple. Since it has been assumed that the thermocouple voltage is at a value with comparison to one of the standard comparison sources K1 which causes the scanning amplifier H1 to be actuated, coil H1—13 of relay H1—12 is energized. This shifts switch arm H1—14 out of engagement with stationary contact H1—16 and into engagement with stationary contact H1—15. This causes current to flow from positive terminal BP—7 through the main alarm MA to the negative terminal BN—9. At the same time, current flows through the following circuit: positive terminal BP—7, switch arm H1—14, stationary contact H1—15, wiper S9—W—4, stationary switch contact S9—4—1, the corresponding cable of the twenty-five wire cable CE—4, to the holding contact R13—1 of the relay R13. Simultaneously, this current passes through coil R13—3 and resistor R13—4 to negative terminal BN—7. This energizes coil R13—3 so that armature R13—2 is attracted into engagement with holding contact R13—1 so that the coil R13—3 is energized through the following circuit: terminal BP—8, armature R13—2, holding contact R13—1, coil R13—3, and resistor R13—4, to negative terminal BN—7. Simultaneously, armature R13—2 engages contact R13—5 and illuminates the individual alarm L13. L13 is one of the individual alarms IA or one of the individual lights L shown in Fig. 6, the term individual alarm being employed to include an audible alarm as well as a visual alarm light L.

Simultaneously, with the foregoing operation, relay H2 is energized through the following circuit: terminal BP—7, movable contact H1—14, stationary contact H1—15, coil H2—3, to negative terminal BN—8. This energizes coil H2—3 so that it attracts its armature H2—4 and thereby shifts the movable switch arms attached to this armature. This switching of movable arm H2—5 moves it out of engagement with stationary contact H2—7 so that the scanning amplifier H1 is deenergized. This deenergizes relay H1—12 and thereby causes movable switch arm H1—14 to disengage stationary contact H1—15 and to reengage stationary contact H1—16. However, movement of switch arm H2—6 into engagement with stationary contact H2—10 has already closed the following circuit: terminal BP—2, movable switch arm H2—6, stationary contact H2—10, manually-operable normally closed switch MS, and coil H2—3 to negative terminal BN—8. Relay H2 therefore remains in the position to which it has moved since its coil H2—3 continues to be energized until switch MS is opened manually. Disengagement of movable switch arm H2—6 from stationary switch contact H2—9 has shut off the power to relay oscillator D so that the stepping coil S9—C of switch S9 is no longer energized and the switch S9 remains in the position which it has assumed. Engagement of switch arm H2—2 with stationary contact H2—11 and engagement of movable switch contact H2—5 with stationary switch contact H2—8 has caused that thermocouple then connected to the wipers S9—W—2 and S9—W—3 to be connected to the measurement responsive device J. Thus, the varying voltage of the thermocouple so connected is conducted to the measurement responsive device J, which may be a potentiometer or any other well known voltage responsive indicator, recorder or controller.

When it is desired to resume the stepping operation of switch S9 and its consequent automatic or cyclic scanning of the thermocouples connected to its switch points, switch MS is opened manually. Opening switch MS deenergizes coil H2—3 of relay H2 so that the movable switch arm H2—5 engages contact H2—7, the movable switch arm H2—2 engages switch contacts H2—1 and the movable switch arm H2—6 engages contact H2—9. Relay oscillator D is therefore again energized from terminal BP—2 so that the pulses of oscillator D again periodically energize operating coil S9—C of switch S9 and causes the wipers S9—W—1 to S9—W—5 to step across the rows or banks of stationary switch contacts. Wipers S9—W—4 is disconnected from positive terminal BP—7. Wiper S9—W—5 is connected to terminal BP—7. Assume now that the thermocouple connected to switch terminals S9—2—1 and S9—3—1 is no longer at such a value that, by comparison with the standard comparison source K1 connected to wire S9—6—1, the thermocouple no longer causes operation of scanning amplifier H1. Therefore, the following circuit remains closed: terminal BP—7, movable arm H1—14, stationary contact H1—16, wiper S9—W—5, stationary contact S9—5—1, the connected wire of twenty-five cable CE—5, and that point R13—6 of relay R13 which is intermediate relay coil R13—3 and resistor R13—4. Since positive voltage is now applied to both ends of relay coil R13—3, this coil is no longer energized. Deenergization of coil R13—3 causes armature R13—2 to disengage stationary contacts R13—1 and R13—5 so that light L13 is deenergized.

It will be evident that similar circuit may be traced from any of the thermocouples connected across the individual wires of the twenty-five wire cables JS—25—1 and JS—25—2. The operation of the relays R13—R37 is similar to the operation of relay R13 as just described.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. A device for selectively or cyclically monitoring a plurality of measuring instruments, including, a selector mechanism having electrical connections for connecting each of said measuring instruments into circuit, a manual operator having operating connection with said selector mechanism for selectively connecting a desired one of the measuring instruments into circuit, an automatic operator having operative connection with said selector mechanism for cyclically connecting each of the measuring instruments in succession into circuit, a comparison unit connected in circuit with the measuring instrument connected into circuit by said selector mechanism so that the electric state of the selected measuring instrument and the preset electric state of said comparison unit can be compared, a scanning amplifier energized in response to a predetermined difference between the electric states of the selected measuring instrument and of the comparison unit, switch mechanism operated by said scanning amplifier when the latter is operative in response to a predetermined difference between the electric states of the selected measuring instrument and of the comparison unit, and a measurement responsive device connected by said switch mechanism into circuit with the connected measuring instrument so that said device responds to the measurement sensed by said instrument.

2. An electric circuit for monitoring a plurality of measuring instruments which produce an electric effect in response to the condition measured, including, selector switch mechanism for connecting each of the measuring instruments into circuit, a manual operator having operative connection with said mechanism for connecting one of said measuring instruments into circuit, an automatic operator for cyclically connecting each of said measuring instruments in sequence into circuit, a manually setable comparison unit adjustable to produce an electric effect having a value intermediate the range of values of the electric effect produced by each of said measuring instruments, an electric condition responsive device responsive to any differences between the electric effects of the selected measuring instrument and of the comparison unit, an electrically operated exhibiting device conected by said electric condition responsive device to the selected measuring instrument, and an identifying indicator connected by said condition responsive device to the selected measuring instrument to identify it.

3. Apparatus for measuring the magnitude of each of a plurality of variable conditions either selectively or sequentially, including, a plurality of potential producing devices each associated with one of said conditions and operative to produce an electric potential varying in accordance with the variations in magnitude of a condition individual thereto, an electrical mechanism operative to determine the magnitude of said electric potentials, selector switch mechanism controlling the electric connection between each of said devices and said mechanism, a comparison unit producing an electric potential for comparison with each of said electric potential producing devices, a converter for changing any difference between the potential of the selected electric potential producing device and the potential of said comparison unit from D. C. to A. C., a relay responsive to A. C. from said converter and controlling the electric connections between the selected electric potential producing device and the electrical mechanism for determining the magnitude, an operator for manually selecting one of said electric potential producing devices for connection to the comparison unit, and a second operator for automatically connecting each of said electric potential producing devices in succession to said comparison unit.

4. An electric circuit for measuring variable magnitudes of electric conditions, including, a plurality of measuring instruments for said varying magnitudes, measuring apparatus for indicating a selected magnitude, selector switch mechanism disposed between said instruments and said apparatus and operable to connect said instruments to said apparatus, an automatic operator for cyclically connecting each of said instruments in sequence to said apparatus, a manual operator for selectively conecting one of said instruments to said apparatus, a comparison unit having a pre-selected invariable magnitude and connected under the control of said selector switch mechanism for comparison with the magnitude measured by the selected measuring instrument, an amplifier responsive to any difference between said selected magnitude and said pre-selected magnitude, and a relay responsive to the operation of said amplifier and controlling the connection of said measuring apparatus to the selected measuring instrument.

5. A manually or automatically operated electric selector circuit, including, a plurality of measuring instruments each adapted to produce an electric quantity in response to changes of a measured variable, selector switch mechanism having contacts arranged to connect each of said instruments into circuit, a manual operator for said selector switch mechanism having operating control of said mechanism to cause said mechanism to connect a selected one of said measuring instruments into circuit, an automatic operator having operating control of said mechanism to cause said mechanism to connect each of said measuring instruments into circuit successively, a comparison unit having electrical connection with said selector switch mechanism so that the instantaneous electric quantity of the connected measuring instrument is compared to the preselected electric quantity of said comparison unit, a scanning amplifier operative in response to the difference between the electrical quantities of the electric measuring instrument and of the comparison unit, a fast acting relay electrically connected to and under the control of said scanning amplifier so as to be operated when said scanning amplifier is operated, and a slowly acting electrical indicating instrument electrically connected by means of and in response to the operation of said relay to the then selected measuring instrument so that said indicating instrument is operated when said relay is operated.

6. An electric circuit for determining variable physical conditions, including, a plurality of electric measuring instruments each having a characteristic which is variable in response to the quantity to be measured, selective contact means for selectively or cyclically connecting said instrument into circuit, an identifying indicator comprising a bank of electric lamps arranged to represent the digits of the decimal system and correlated to said instruments in order to identify the one instrument connected at a time by said contact means, a manual operator controlling said selective contact means to selectively connect one of said instruments into circuit, an automatic operator controlling said selective contact means to cyclically connect each of said instruments in sequence into circuit, a quick-acting transfer switch electrically connected by said selective contact means to a selected one of said instruments, and a relatively slowly acting electric indicating instrument having exhibiting means for indicating the value of the quantity to be measured by the connected measuring instrument when said electric indicating instrument is electrically connected to the connected measuring instrument by said relay.

7. An electric circuit for determining variable measuring conditions, including, a plurality of electric gauge elements each varying in magnitude of an electric condition in accordance with the quantity to be measured, an electric measuring network having a potentiometer comprising a resistor and a movable slide contact for varying the voltage of the potentiometer through a range including a voltage value indicative of said magnitude, manually operable means for adjusting said slide contact to select an electric condition value for comparison with the electric condition of the selected electric gauge element, selective contact means interposed between said gauge elements and said network for selectively or cyclically connecting each of said gauge elements to said network, a manual operator controlling said selective contact means to selectively connect one of said gauge elements to said network, an automatic operator controlling said selective contact means to cyclically connect each of said gauge elements in sequence to said network, a relay electrically connected by said selective contact means to the then selected gauge element and operating with a fast time cycle in response to the difference between said electric condition value of the connected gauge element and of the potentiometer, and an electric indicating device adapted to indicate at the end of a relatively long time cycle when connected by said relay to the selected electric gauge element in response to the relay being energized.

8. An electric circuit for selectively or successively connecting each of a plurality of measuring instruments to a measurement responsive device, including, selector switch mechanism controlling electric circuit connections between each of the instruments and the device, an electric motor for moving said mechanism, a manually-operable electric switch adapted for connection to a source of D. C. and operable to supply a selected series of pulses to said motor to cause said motor to move said mechanism, an automatically operable electric switch adapted for connection to a source of D. C. and operable to supply a continuous series of pulses to cause said motor to operate said mechanism, at least one electric switch manually-operable to one position to cause said manual switch to control said mechanism and to another position to cause said automatic switch to control said mechanism, a comparison unit having a preselected invariable magnitude and electrically connected by said selector switch mechanism to the selected measuring instrument for comparison with the magnitude measured by the selected measuring instrument, an amplifier electrically connected and responsive to the difference between said selected magnitude and said preselected invariable magnitude, and a relay responsive with snap action to the operation of said amplifier and controlling the electrical connection of said measurement responsive device to the selected measuring instrument, said measurement responsive device being operative to give an indication of the magnitude measured by the selected measuring instrument after a relatively long period of time.

9. An electric circuit for selectively or cyclically measuring the magnitude of each of a plurality of variable conditions, including a plurality of measuring instruments each associated with one of said conditions and operative to produce an electric potential varying in accordance with the variations in magnitude of the condition individual thereto, an electric indicating device operative to give an indication at the end of a relatively long time cycle, a plurality of electric selective switches each having pairs of terminals connected to one of said measuring instruments, a plurality of electric motors each having driving engagement with each of said switches, a plurality of relays each controlling the connection between one of said motors and a source of electricity, an automatically operated device for energizing any selected one of said relays with a continuous series of electric pulses until interrupted, a manually operable device for energizing any selected one of said relays with a manually selected number of pulses, and an electric transfer switch electrically connected by said selective switches to each of said measuring instruments in succession and operative with a quick action to connect electrically said electric indicating device to the selected measuring instrument.

10. Apparatus for measuring the voltage of each of a plurality of variable voltage sources, including, a potentiometric bridge circuit comprising a slidewire resistor and a source of current maintaining current flow therethrough and potential drops in said resistance and a contact adjustable along said slidewire resistance, a quick acting electric relay, an electric measuring instrument adapted to give its measurement after a relatively long period of time, selector switch mechanism comprising a series of electric contacts connected in pairs to each of said sources, a switch element movable to successively engage the different switch contacts in pairs in predetermined order and to connect them to said electric relay to cause it to operate in response to the difference between the selected variable voltage source and the source of current maintaining current flow through and potential drops in said resistance, a manual operator having operative engagement with said switch element to move it to engage a selected pair of said switch contacts and to connect them to said electric relay, and an automatic operator having operative engagement with said switch element to move it cyclically to engage pairs of said switch contacts successively and to connect them to said electric relay.

11. A device for rapidly scanning and logging a plurality of thermocouples, including a plurality of electric selector switches each having stationary switch contacts connected to said thermocouples and moving switch contacts adapted for selective or cyclic engagement with said stationary switch contacts, a plurality of electric motors each having driving engagement with one of said switches, manually operable means for energizing selectively said motors to select one of said thermocouples by connecting said movable switch contacts to the desired stationary switch contacts, automatically operating means for energizing cyclically said motors to monitor said thermocouples by connecting said movable switch contacts to said stationary switch contacts in succession, an identifying indicator comprising a plurality of electric lamps having electric circuit connections controlled by said selector switches to indicate by digits the one thermocouple which is connected in circuit, a manually adjustable source of voltage electrically connected under the control of said selector switches to the selected thermocouple for comparison with the voltage of the selected thermocouple, a converter electrically connected to said source of voltage for changing the difference in a selected direction of polarity between the voltage of the selected thermocouple and the voltage of said source of voltage from D. C. to A. C., an amplifier electrically connected to said converter for amplifying the converted A. C., a quick acting relay electrically connected to said amplifier so as to be energized thereby when the thermocouple voltage varies from the source of voltage in a predetermined manner, a potentiometric recorder having print mechanism adapted to print after a relatively long time cycle, and electric circuit connections under the control of said relay connecting said recorder to the then selected thermocouple.

WALLACE E. BELCHER, Jr.

REFERENCES CITED

The following references are of record in the file of this patent:

UNITED STATES PATENTS

| Number | Name | Date |
|---|---|---|
| 2,283,525 | Witham | May 19, 1942 |
| 2,407,361 | Wilson | Sept. 10, 1946 |
| 2,427,355 | Keinath | Sept. 16, 1947 |
| 2,449,304 | Lamp | Sept. 14, 1948 |
| 2,452,023 | Wild | Oct. 19, 1948 |

FOREIGN PATENTS

| Number | Country | Date |
|---|---|---|
| 502,711 | Great Britain | Mar. 23, 1939 |